(12) United States Patent
Itou et al.

(10) Patent No.: US 8,384,856 B2
(45) Date of Patent: Feb. 26, 2013

(54) COLOR FILTER SUBSTRATE AND DISPLAY DEVICE

(75) Inventors: Akiko Itou, Uji-Shi (JP); Kohzoh Nakamura, Kashiba (JP); Shun Ueki, Nara (JP); Tokio Taguchi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 913 days.

(21) Appl. No.: 11/910,520

(22) PCT Filed: Mar. 30, 2006

(86) PCT No.: PCT/JP2006/306659
§ 371 (c)(1),
(2), (4) Date: Oct. 2, 2007

(87) PCT Pub. No.: WO2006/109577
PCT Pub. Date: Oct. 19, 2006

(65) Prior Publication Data
US 2009/0141381 A1 Jun. 4, 2009

(30) Foreign Application Priority Data

Apr. 5, 2005 (JP) .................. 2005-109226
Oct. 7, 2005 (JP) .................. 2005-295779

(51) Int. Cl.
*G02F 1/1335* (2006.01)

(52) U.S. Cl. ........................................ 349/106

(58) Field of Classification Search ............... None
See application file for complete search history.

(56) References Cited

U.S. PATENT DOCUMENTS

| 4,800,375 | A | * | 1/1989 | Silverstein et al. ............ 345/694 |
| 5,153,568 | A | * | 10/1992 | Shaw ............................... 345/88 |
| 5,587,819 | A | * | 12/1996 | Sunohara et al. ............ 349/106 |
| 5,642,176 | A | | 6/1997 | Abukawa et al. |
| 6,057,900 | A | | 5/2000 | Ono et al. |
| 6,323,921 | B1 | | 11/2001 | Kurauchi et al. |

(Continued)

FOREIGN PATENT DOCUMENTS

| JP | 6-273617 A | 9/1994 |
| JP | 08-140113 A | 5/1996 |

(Continued)

OTHER PUBLICATIONS

Official communication issued in the International Application No. PCT/JP2006/306659, mailed on Jun. 6, 2006.

(Continued)

*Primary Examiner* — Lucy Chien
(74) *Attorney, Agent, or Firm* — Keating & Bennett, LLP

(57) ABSTRACT

A color filter substrate and a display device are each capable of reducing color separation of a straight line displayed with a mixed color and particularly color separation of a straight white line displayed with a mixed color on a black background. The color filter substrate is a color filter substrate including colored layers of at least four colors, arrayed inside a pixel region, wherein at least one pair of colored layers that are not next to each other when the colored layers of all the colors are arrayed in order of hue is adjacently arranged to each other inside the pixel region.

9 Claims, 9 Drawing Sheets

U.S. PATENT DOCUMENTS

| | | | |
|---|---|---|---|
| 6,373,538 B2 * | 4/2002 | Okumura et al. | 349/106 |
| 7,015,506 B2 | 3/2006 | Tokuda et al. | |
| 7,268,757 B2 * | 9/2007 | Ben-David et al. | 345/88 |
| 7,443,469 B2 * | 10/2008 | Maeda et al. | 349/108 |
| 2001/0004253 A1 * | 6/2001 | Fukutoku et al. | 345/96 |
| 2004/0130253 A1 | 7/2004 | Ohsaki et al. | |
| 2004/0150769 A1 | 8/2004 | Tokuda et al. | |
| 2004/0174389 A1 | 9/2004 | Ben-David et al. | |
| 2005/0008770 A1 | 1/2005 | Kawase | |
| 2005/0122294 A1 | 6/2005 | Ben-David et al. | |
| 2005/0236950 A1 | 10/2005 | Maeda et al. | |
| 2005/0237450 A1 * | 10/2005 | Hu et al. | 349/108 |
| 2005/0243048 A1 | 11/2005 | Moriya et al. | |
| 2005/0270444 A1 * | 12/2005 | Miller et al. | 349/108 |
| 2006/0158454 A1 * | 7/2006 | Heynderickx et al. | 345/589 |

FOREIGN PATENT DOCUMENTS

| | | |
|---|---|---|
| JP | 09-251160 A | 9/1997 |
| JP | 2001-209047 A | 8/2001 |
| JP | 2001-306023 A | 11/2001 |
| JP | 2001-343636 A | 12/2001 |
| JP | 2003-163940 A | 6/2003 |
| JP | 2003-233063 A | 8/2003 |
| JP | 2003-342638 A | 12/2003 |
| JP | 2004-529396 A | 9/2004 |
| JP | 2005-234133 A | 9/2005 |
| JP | 2005-309305 A | 11/2005 |
| JP | 2005-338783 A | 12/2005 |
| JP | 2006-106437 A | 4/2006 |
| WO | 02/101644 A2 | 12/2002 |
| WO | 03/088203 A1 | 10/2003 |
| WO | 2006/018296 A1 | 2/2006 |
| WO | 2006/018926 A1 | 2/2006 |
| WO | 2006/019025 A1 | 2/2006 |

OTHER PUBLICATIONS

Yang et al.; "Development of Six Primary-Color LCD"; SID 05 Digest; May 25, 2005; pp. 1210-1213.

Chino et al.; "Development of Wide-Color-Gamut Mobile Displays With Four-Primary-Color LCDs"; SID 06 Digest; Jun. 7, 2006; pp. 1221-1224.

M. Ben-Chorin; "Improving LCD TV Color Using Multi-Primary Technology"; Genoa Color Technologies; Flat Panel Display; International 2005 Forum; Oct. 19, 2005; pp. 1-53.

* cited by examiner

Fig. 7A
| G | Y | G | Y |
|---|---|---|---|
| R | B | R | B |
| G | Y | G | Y |
| R | B | R | B |
. . . .
Fig. 7B
| G | Y | B | R |
|---|---|---|---|
| R | B | Y | G |
| G | Y | B | R |
| R | B | Y | G |
. . . .
Fig. 8
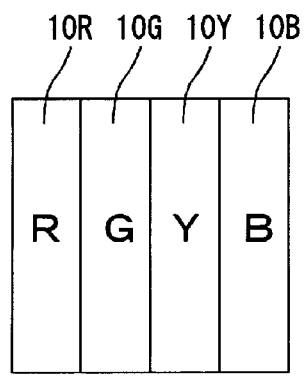
Fig. 9
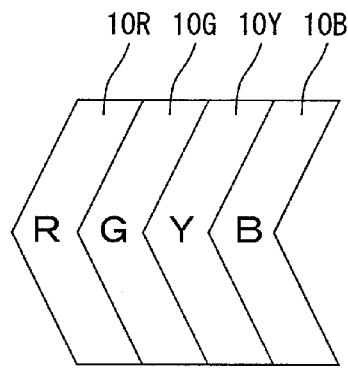

Fig.16
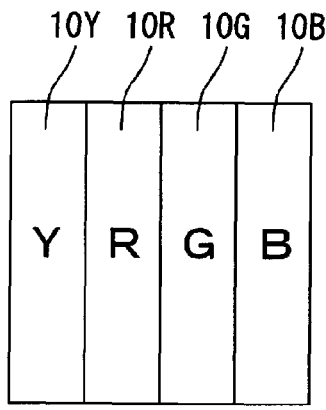
Fig.17
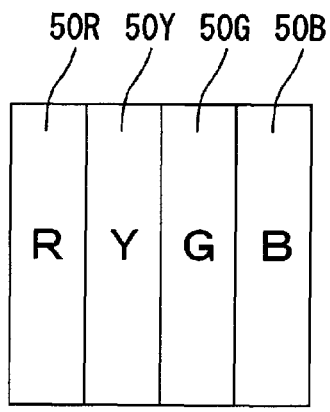
Fig.18 – PRIOR ART
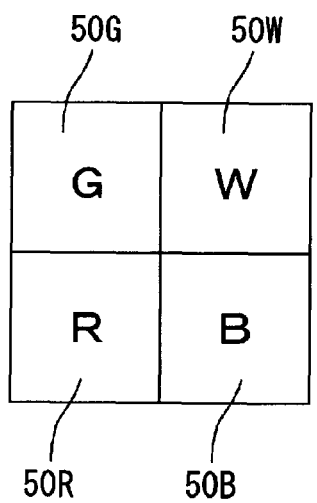

COLOR FILTER SUBSTRATE AND DISPLAY DEVICE

BACKGROUND OF THE INVENTION

1. Field of the Invention

The present invention relates to color filter substrates and display devices. More specifically, the present invention relates to a color filter substrate preferably used in multi-primary color display devices which display characters, images, moving images, and the like; and a display device such as a liquid crystal display device, and such a color filter substrate and a display device are used in a cellular telephone, for example.

2. Description of the Related Art

A color filter substrate is one member equipped with a display device to provide color display, and generally, on such a color filter substrate, a plurality of colored layers is regularly arranged in every pixel. As a combination of colors of such colored layers constituting the pixel, three primary colors of red (R), green (G), and blue (B) are used. In such a combination, however, a range of color which can be observed by human eyes can be only partly displayed, and therefore the color reproduction range is limited. Therefore, a configuration in which colored layers of four or more primary colors (hereinafter, also referred to as "multi-primary colors") are arranged in every pixel in view of expansion of the color reproduction range now has been proposed.

A color display device configuration in which sub-pixels of R, G, B, and yellow (Y) are arrayed in a matrix pattern, as shown in FIG. 5, was disclosed as such a multi-primary color filter substrate, for example (for example, refer to Patent Documents 1 and 2). However, according to this configuration, the sub-pixels are arrayed in order of hue (in order of R, Y, G, B) in the clockwise or counterclockwise direction, and R and G which are opponent colors, and Y and B which are opponent colors, are diagonally arranged with respect to each other, respectively. Therefore, the color lights are insufficiently mixed. Therefore, if a straight line is displayed with a mixed color, color separation of the straight line is observed. Particularly if a straight white line is displayed with a mixed color of RGBY on a black background in the row or column direction, the color separation is more clearly observed. In this point, such a configuration has room for improvement.

A configuration in which the above-mentioned sub-pixels of four colors are arrayed in a stripe pattern, as shown in FIG. 17, was disclosed (for example, refer to Patent Document 1: WO 03/088203 and Patent Document 2: Japanese Kokai Publication No. 2001-209047).

Also in this configuration, however, the sub-pixels are arrayed in order of hue in the array direction (row direction), and therefore R and G which are opponent colors, and B and Y which are opponent colors are arranged with another color therebetween and the color lights are insufficiently mixed. Accordingly, if a straight white line is displayed with a mixed color of RGBY on a black background in the direction perpendicular to the array direction of the sub-pixels, color separation of the straight line is observed. In this point, such a configuration has room for improvement.

A pixel configuration in which a color unit of R, G, B, and white (W) is arrayed in a matrix pattern in order of R, G, W, B in the clockwise direction, as shown in FIG. 18, was disclosed (for example, refer to Patent Document 3: U.S. Pat. No. 5,642,176). However, such a configuration has room for improvement in that its color reproduction range is smaller than that in a pixel configuration constituted by a normal RGB color unit, because W is not a chromatic color.

SUMMARY OF THE INVENTION

In order to overcome the problems described above, preferred embodiments of the present invention provide a color filter substrate and a color display device, each capable of reducing color separation of a straight line displayed with a mixed color, particularly color separation of a straight white line displayed with a mixed color on a black background.

The present inventors conducted various investigations regarding a color filter substrate including colored layers of at least four colors, arrayed inside a pixel region, and noted hue of the colored layers. The inventors found that if at least one pair of colored layers not next to each other when the colored layers of at least four colors are arrayed in order of hue is adjacently arranged to each other inside the pixel region, color lights from the at least one pair of colored layers can be sufficiently mixed inside the pixel region, and thereby color separation of a straight white line displayed with a mixed color on a black background can be reduced. As a result, the above-mentioned problems have been advantageously solved, leading to development of preferred embodiments of the present invention.

According to a preferred embodiment of the present invention, a color filter substrate includes colored layers of at least four colors, arrayed inside a pixel region, wherein at least one pair of colored layers not next to each other when the colored layers of all the colors are arrayed in order of hue is adjacently arranged to each other inside the pixel region.

Examples of the array of the colored layers in the color filter substrate of the present invention include a preferred embodiment in which the colored layers of at least four colors are arrayed inside every pixel region in a two-dimensional manner and a preferred embodiment in which the colored layers of at least four colors are arrayed inside the pixel region in a one-dimensional manner. That is, examples of the color filter substrate according to a preferred embodiment of the present invention include a color filter substrate including colored layers of at least four colors, arrayed inside every pixel region in a two-dimensional manner, wherein at least one pair of colored layers that are not next to each other when the colored layers of all the colors are arrayed in order of hue is adjacently arranged to each other inside the pixel region (hereinafter, also referred to as "first color filter substrate") and a color filter substrate including colored layers of at least four colors, arrayed inside a pixel region in a one-dimensional manner, wherein at least one pair of colored layers that are not next to each other when the colored layers of all the colors are arrayed in order of hue is adjacently arranged to each other inside the pixel region (hereinafter, also referred to as "second color filter substrate").

The first color filter substrate according to a preferred embodiment of the present invention is described first.

According to the first color filter substrate of a preferred embodiment of the present invention, the colored layers of at least four colors are arranged inside every pixel region in a two-dimensional manner. In this description, the colored layer means a layer capable of selectively transmitting visible light with a specific wavelength range. A resin into which a pigment is dispersed and the like may be mentioned as a material for the above-mentioned colored layer. Red (R), green (G), blue (B), yellow (Y), cyan (C), magenta (M) and the like are mentioned as the color of the above-mentioned colored layers. With respect to a combination of four colors, a combination of R, G, B, and Y, and a combination of R, G, B, and C may be mentioned, for example. The pixel region means a region corresponding to one pixel in a display device with which the color filter substrate according to a preferred embodiment of the present invention is equipped. That is, the pixel region means a region corresponding to one minimum unit for display, and the array of the colored layers is determined inside one pixel region. It is preferable that the above-mentioned pixel region is arranged in a matrix pattern so that a display device can provide matrix display.

According to the first color filter substrate, the colored layers of at least four colors are arranged inside every pixel region in a two-dimensional manner. The above-mentioned "two-dimensional manner" means that a plurality of colored layers formed inside each pixel region are not arranged in one direction (the number of the array direction of the colored layers is not one). A preferred embodiment in which every colored layer formed inside each pixel region is adjacent to two or more colored layers is preferable. Examples of the above-mentioned preferred embodiment in which the colored layers are arrayed inside every pixel region in a two-dimensional manner include a preferred embodiment in which the colored layers are arranged in a matrix pattern (for example, refer to FIG. 1) and a preferred embodiment in which the colored layers are arranged in longitudinal and lateral directions not perpendicular to each other (for example, refer to FIG. 2), if the colored layers are arrayed in two directions. In the above-mentioned pixel region, a plurality of colored layers of the same color may be arranged, but it is preferable that colored layers of respective colors are disposed one each. The color combination of the colored layers disposed inside the above-mentioned pixel region is not especially limited, but it is preferable that all of the pixel regions have the same color combination. In the above-mentioned pixel region, alight-shading layer may be disposed between the colored layers in order to prevent light leakage between the colored layers. The above-mentioned light-shading layer may be formed by overlapping of the above-mentioned colored layers. In addition, a projective structure (bank) may be disposed between the colored layers in order to prevent inks with different colors from being mixed when the above-mentioned colored layers are formed by an ink-jet method and the like.

According to the above-mentioned first color filter substrate, at least one pair of colored layers that are not next to each other when the colored layers of all the colors are arrayed in order of hue is adjacently arranged to each other inside the pixel region. As a result, color lights transmitted through the at least one pair of colored layers are sufficiently mixed inside the pixel region, and thereby color separation of a straight white line displayed with a mixed color on a black background can be reduced. According to such a first color filter substrate of a preferred embodiment of the present invention, if red (R), yellow (Y), green (G), and blue (B) colored layers are used, at least one of a pair of the R colored layer and the G colored layer, and a pair of the Y colored layer and the B colored layer are arranged next to each other.

In this description, the "colored layers of all the colors are arrayed in order of hue" means that the colored layers of all the colors are circularly arrayed in order of hue. Accordingly, if red (R), yellow (Y), green (G), and blue (B) colored layers are arrayed in order of hue, the R colored layer is next to the Y and B colored layers, but not next to the G colored layers, and the Y colored layer is next to the R and G colored layers, but not next to the B colored layer. Further, the "one pair of colored layers is adjacently arranged to each other inside the pixel region" means that one pair of colored layers arranged inside the same pixel region is faced to be in contact with each other at least a part of one side surface of each layer. If the light-shading layer and/or the bank are/is disposed between the above-mentioned one pair of the colored layers, one pair of colored layers arranged inside the same pixel region is faced across the light-shading layer and/or the bank at least a part of one side surface of each layer. The preferred embodiment in which "at least one pair of the colored layers is adjacently arranged to each other inside the pixel region" is preferably a preferred embodiment in which a pair of colored layers arranged inside the same pixel region is faced to be in contact with each other at the entire of one side surface of each layer, and it is preferable that one pair of colored layers arranged inside the same pixel region is arranged to face across the light-shading layer and/or the bank at the entire of one side surface of each layer if the light-shading layer and/or the bank are/is arranged between a pair of colored layers.

The first color filter substrate according to a preferred embodiment of the present invention may or may not include other components as long as it includes the above-mentioned colored layer as a component. The structure of the first color filter substrate is not especially limited, and a structure in which the colored layer, an overcoat layer, a transparent electrode, an alignment film are stacked on a transparent substrate in this order, and the like may be preferably used if the first color filter substrate is used in a liquid crystal display device.

The first color filter substrate according to a preferred embodiment of the present invention may include the light-shading layer and/or the bank between the colored layers arranged inside the same pixel region, and may also include the light-shading layer and/or the bank between the colored layers arranged inside different pixel regions. Also, such a light-shading layer may be formed by overlapping of colored layers of different colors.

According to the above-mentioned first color filter substrate, it is sufficient that at least one pair of colored layers that are not next to each other when the colored layers of all the colors are arrayed in order of hue is adjacently arranged to each other inside at least one pixel region, but it is particularly preferable that the above-mentioned at least one pair of the colored layers are adjacently arranged to each other inside every pixel region.

Preferred embodiments of the first color filter substrate of the present invention are described in more detail below. According to the above-mentioned first color filter substrate, it is preferable that all pairs of colored layers (all combinations of the colored layers) not next to each other when the colored layers of all the colors are arrayed in order of hue are adjacently arranged to each other inside the pixel region. As a result, color separation of a straight white line displayed with a mixed color on a black background can be more effectively reduced. According to the first color filter substrate in such a preferred embodiment, both a pair of a red (R) colored layer and a green (G) colored layer, and a pair of a yellow (Y) colored layer and a blue (B) colored layer, are adjacently arranged to each other, respectively, if R, Y, G, and B colored layers are used.

It is preferable in the above-mentioned first color filter substrate that at least one pair of colored layers that are next to each other when the colored layers of all the colors are arrayed in order of hue are not adjacently arranged to each other inside the pixel region. As a result, coloring of a straight line, generated when colored layers having similar hues are adjacently arranged to each other inside the pixel region, can be prevented. According to the first color filter substrate in such a preferred embodiment, among a pair of a R colored layer and a B colored layer, a pair of a B colored layer and a G colored layer, a pair of an G colored layer and a Y colored layer, and a pair of an Y colored layer and a R colored layer, any pair of the colored layers is not adjacently arranged to each other. Among them, the pair of the R colored layer and the B colored layer are adjacent to each other when arrayed in order of hue, but has relatively small effects when adjacently arranged to each other because the R colored layer and the B colored layer have largely different dominant wavelengths. Further, the pair of the G colored layer and the Y colored layer is a pair of colored layers with large luminances. Therefore, it is preferable that the G colored layer and the Y colored layer are adjacently arranged to each other from viewpoints other than a viewpoint of prevention of the straight line color separation. Accordingly, a preferred embodiment in which the B colored layer and the G colored layer are not adjacently arranged to each other and a preferred embodiment in which the Y colored layer and the R colored layer are not adjacently arranged to each other are particularly preferable. A mixed light of a B light and a G light is recognized as a cyan light, and a mixed light of a Y light and a R light is recognized as an orange light. If there are a part where the B colored layer and the G colored layer are adjacently arranged to each other and a part where the Y colored layer and the R colored layer are adjacently arranged to each other inside the pixel region, a straight line is observed to be separated into a cyan color and an orange color. In this description, the preferred embodiments in which "one pair of colored layers are not adjacently arranged to each other inside the pixel region" includes a preferred embodiment in which one pair of colored layers arranged inside the same pixel region is in contact with each other only at a vertex of each layer (the colored layers are diagonally arranged to each other) and a preferred embodiment in which at least one pair of colored layers arranged inside the same pixel region are not adjacent to each other at all (the colored layers are separately arranged to each other), for example. The preferred embodiment in which the colored layers are diagonally arranged relative to each other is particularly preferably used in the first color filter substrate. That is, it is more preferable in the above-mentioned first color filter substrate that at least one pair of colored layers adjacent to each other when the colored layers of all the colors are arrayed in order of hue are diagonally arranged to each other inside the pixel region. As a result, the colored layers having similar hues are spaced from each other inside the pixel region, and therefore coloring of a straight line, generated when colored layers having similar hues are arranged next to each other inside the pixel region, can be more effectively prevented.

It is preferable in the above-mentioned first color filter substrate that a colored layer with a maximum luminance and a colored layer with a second highest luminance are adjacently arranged to each other inside the pixel region. As a result, a difference in line width between a straight white line displayed in the right oblique direction and that in the left oblique direction when the straight white line is displayed in oblique directions with mixed color on a black background can be reduced. A ratio of (The maximum luminance):(the second highest luminance) is preferably 4:3 to 5:3 in view of more effective exhibition of the operation and effects of preferred embodiments of the present invention. According to the first color filter substrate in such a preferred embodiment, a yellow (Y) colored layer and a green (G) colored layer are adjacently arranged if red (R), Y, G, and blue (B) colored layers are used, for example. In this description, the "luminance of the colored layer" is determined based on a light amount of transmitted light when a white light at a specific light amount (standard illuminant D65: color temperature of the illuminant is about 6504 K) is transmitted through the colored layer.

It is preferable that one each of colored layers of four colors is arranged inside the pixel region in a matrix pattern. According to this matrix arrangement, color separation of a straight white line displayed in a row direction or a column direction with a mixed color on a black background can be reduced. In addition, the operation and effects according to preferred embodiments of the present invention can be simply and inexpensively obtained. In this description, the "one each of colored layers of four colors is arranged inside the pixel region in a matrix pattern" means that colored layers of four different colors are arranged inside the pixel region in two rows and two columns.

It is preferable that in the above-mentioned first color filter substrate in accordance with the matrix arrangement, a colored layer with a maximum luminance, a colored layer with a second highest luminance, a colored layer with a third highest luminance, and a colored layer with a fourth highest luminance are arranged in this order (circularly) inside the pixel region. According to this, a luminance ratio of the upper half to the lower half or a luminance ratio of the right half to the left half of the pixel region can be close to 1, and therefore the color separation of the straight line can be further reduced. In order to more effectively obtain the operation and effects of preferred embodiments of the present invention, a ratio of (a total of the maximum luminance and the fourth-highest luminance value) (a total of the second-highest luminance and the third-highest luminance) is preferably 2:3 to 3:2, and more preferably closer to 1:1.

It is preferable in the above-mentioned first color filter substrate in accordance with the matrix arrangement that a red (R) colored layer, a green (G) colored layer, a yellow (Y) colored layer, and a blue (B) colored layer are arranged in this order (circularly arranged) inside the pixel region. According to this preferred embodiment, the B colored layer and the G colored layer, and the Y colored layer and the R colored layer, are diagonally arranged to each other, respectively. Examples of such a preferred embodiment include a preferred embodiment in which R, G, Y, and B colored layers are arranged in this order in the clockwise direction inside the pixel region, as shown in FIG. 1. According to this, the R colored layer and the G colored layer which are opponent colors, and the Y colored layer and the B colored layer which are opponent colors, are adjacently arranged to each other, respectively, and therefore a R light and a G light, and a Y light and a B light, are sufficiently mixed, respectively. In addition, the luminance ratio of the RG line to the YB line can be close to 1 because the direction where the Y colored layer with the maximum luminance and the B colored layer with the fourth luminance are adjacently arranged to each other and the direction where the G colored layer with the second highest luminance and the R colored layer with the third highest luminance are adjacently arranged to each other are the same in the row or column direction. Therefore, color separation of a straight line displayed with a mixed color of RGBY on a black background can be reduced. In addition, the Y colored layer with the maximum luminance and the G colored layer with the second-highest luminance are adjacently arranged to each other, and therefore, a linewidth of a straight white line displayed in the right oblique direction and that of a straight white line displayed in the left oblique direction can be the same when the straight white lines are displayed in oblique directions with a mixed color of RGBY on a black background.

In this description, as shown in FIG. 3, the red is a color having a dominant wavelength of 597 nm or more and 780 nm or less in CIE 1931 xy chromaticity diagram and preferably 600 nm or more and 620 nm or less; the yellow is a color having a dominant wavelength of 558 nm or more and less than 597 nm, and preferably 570 nm or more and 582 nm or less; the green is a color having a dominant wavelength of 488 nm or more and less than 558 nm, and preferably 520 nm or less and 557 nm or less; and the blue is a color having a dominant wavelength of 380 nm or more and less than 488 nm, and preferably 455 nm or more and 475 nm or less.

The direction where the above-mentioned R, G, Y, and B colored layers are arranged in this order inside the pixel region may be counterclockwise direction, and also in such a preferred embodiment, the same operation-effect can be exhibited. The above-mentioned color array directions of the R, G, B, and Y colored layers may be the same inside all of the pixel regions, and may be different among the pixel regions. If the above-mentioned color array directions of the R, G, B, and Y colored layers are the same inside all of the pixel regions, the color positions of the above-mentioned colored layers may be the same inside all of the pixel regions or may be different among the pixel regions.

Next, a second color filter substrate according to a preferred embodiment of the present invention is described.

According to the above-mentioned second color filter substrate, the colored layers of at least four colors are arranged inside the pixel region in a one-dimensional manner. The above-mentioned one-dimensional manner means that the number of the array direction of the colored layers is one. Examples of the above-mentioned preferred embodiments in which colored layers are arranged inside the pixel region in a one-dimensional manner include (1) a preferred embodiment in which the colored layers are arranged in a stripe pattern inside every pixel region (for example, refer to FIG. 8), (2) a preferred embodiment in which in the above-mentioned preferred embodiment (1), the color arrays of the colored layers are the same inside all of the pixel regions, (3) a preferred embodiment in which in the above-mentioned preferred embodiment (2), the above-mentioned colored layers are arranged over a plurality of the pixel regions in such a way that adjacent pixel regions share the colored layers of the same colors, and (4) a preferred embodiment in which in the above-mentioned preferred embodiments (1) to (3), the colored layers have a curved shape (for example, refer to FIG. 9). Inside the above-mentioned pixel region, a plurality of colored layers of the same color may be arranged, but it is preferable that colored layers of respective colors are arranged one each. The color combination of the colored layers arranged inside the above-mentioned pixel region is not especially limited, but it is preferable that the color combinations are the same inside all of the pixel regions. Inside the above-mentioned pixel region, a light-shading layer may be disposed between the colored layers in order to prevent light leakage between the colored layers. The above-mentioned light-shading layer may be formed by overlapping of the above-mentioned colored layers. In addition, a projective structure (bank) may be disposed between the colored layers in order to prevent inks with different colors from being mixed when the above-mentioned colored layers are formed by an ink-jet method and the like.

According to the above-mentioned second color filter substrate, at least one pair of colored layers not next to each other when the colored layers of all the colors are arrayed in order of hue is adjacently to each other arranged inside the pixel region. As a result, color lights transmitted through the above-mentioned at least one colored layers are sufficiently mixed inside the pixel region, and thereby color separation of a straight white line displayed with a mixed color on a black background in a direction substantially vertical to the array direction of the colored layers can be reduced.

Also the second color filter substrate according to preferred embodiments of the present invention may or may not include other components as long as it includes the above-mentioned colored layer as a component. The structure of the second color filter substrate is not especially limited, and a structure in which a colored layer, an overcoat later, a transparent electrode, an alignment film are stacked on a transparent substrate in this order, and the like may be preferably used if the second color filter substrate is used in a liquid crystal display device.

The second color filter substrate according to preferred embodiments of the present invention may include the light-shading layer and/or the bank between the colored layers arranged inside the same pixel region, as mentioned above, and also include the light-shading layer and/or the bank between the colored layers arranged inside different pixel regions. Also such a light-shading layer may be formed by overlapping of colored layers of different colors. According to the above-mentioned second color filter substrate, it is sufficient that at least one pair of colored layers not next to each other when the colored layers of all the colors are arrayed in order of hue is adjacently arranged to each other inside at least one pixel region, but it is particularly preferable that the above-mentioned at least one pair of colored layers is adjacently arranged to each other inside every pixel region.

Preferred embodiments of the second color filter substrate of the present invention are described in more detail below. It is preferable in the above-mentioned second color filter substrate that all pairs of colored layers not next to each other when the colored layers of all the colors are arrayed in order of hue are adjacently arranged to each other inside the pixel region. As a result, the above-mentioned color separation of the straight line can be more effectively reduced.

It is preferable in the above-mentioned second color filter substrate that at least one pair of colored layers next to each other when the colored layers of all the colors are arrayed in order of hue is not adjacently arranged to each other inside the pixel region. As a result, coloring of a straight line, generated when colored layers having similar hues are adjacently arranged to each other inside the pixel region, can be prevented. The preferred embodiment in which the colored layers are separately arranged to each other is particularly preferably used in the above-mentioned second color filter substrate. That is, it is preferable in the above-mentioned second color filter substrate that at least one pair of colored layers next to each other when the colored layers of all the colors are arrayed in order of hue is separately arranged to each other inside the pixel region. As a result, colored layers having similar hues are arranged to be spaced to each other inside the pixel region, and therefore coloring of a straight line, generated when the colored layers having similar hues are adjacently arranged to each other inside the pixel region, can be more effectively prevented.

It is preferable in the above-mentioned second color filter substrate that a colored layer with a maximum luminance and a colored layer with the second highest luminance are adjacently arranged to each other inside the pixel region. As a result, color lights from the colored layer with the maximum luminance and the colored layer with the second highest luminance can be sufficiently mixed inside the pixel region, and thereby the above-mentioned color separation of the straight line can be further reduced. It is preferable that a ratio of (the maximum luminance):(the second highest luminance) is 4:3 to 5:3 in view of more effective exhibition of the operation and effects of preferred embodiments of the present invention.

It is preferable that the colored layer with the maximum luminance and the colored layer with the second highest luminance are arranged next to each other at a center portion of the pixel region. The above-mentioned color separation of the straight line can be particularly reduced. The center portion of the pixel region means a region where second and third colored layers are arranged when first to fourth colored layers having the same shape are arrayed in this order in the column direction in a one-dimensional manner, for example, and means a region where second and third colored layers are arranged or a region where third and fourth colored layers are arranged when first to fifth colored layers having the same shapes are arrayed in this order in the column direction in a one-dimensional manner.

It is preferable in the above-mentioned second color filter substrate that one each of colored layers of four colors is arranged inside the pixel region in a stripe pattern. According to this stripe arrangement, color separation of a straight white line displayed with a mixed color on a black background in the direction vertical to the array direction of the colored layers can be reduced. In addition, the operation and effects according to preferred embodiments of the present invention can be simply and inexpensively obtained. In this description, the "one each of colored layers of four colors is arranged inside the pixel region in a stripe pattern" means that colored layers of four different colors are arranged in one row and four columns or in four rows and one column inside the pixel region.

It is preferable in the second color filter substrate in the above-mentioned stripe arrangement that a colored layer with a fourth highest luminance, a colored layer with a maximum luminance, a colored layer with a second highest luminance, and a colored layer with a third luminance are arranged in this order inside the pixel region. According to this, the colored layer with the maximum luminance and the colored layer with the second highest luminance are arranged at substantially the center of the pixel region, and a luminance ratio of the right half to the left half of the pixel region can be close to 1. Therefore, color separation of a straight line displayed in the direction vertical to the array direction of the colored layers can be further reduced. It is preferable that a ratio of (a total of the maximum luminance and the fourth-highest luminance value) (a total of the second-highest luminance and the third-highest luminance) is preferably 2:3 to 3:2, and more preferably closer to 1:1 in view of more effective exhibition of the operation and effects of preferred embodiments of the present invention.

It is preferable in the second color filter substrate in the above-mentioned stripe arrangement that a red colored layer, a green colored layer, a yellow colored layer, and a blue colored layer are arranged in this order inside the pixel region. Examples of such preferred embodiments include a preferred embodiment in which stripe-shaped R, G, Y, and B colored layers are arranged inside the pixel region in this order in the right direction in FIG. 8. According to this, the R colored layer and the G colored layer which are opponent colors, and the Y colored layer and the B colored layer which are opponent colors, are adjacently arranged to each other, respectively, and therefore a R light and a G light, and a Y light and a B light, are sufficiently mixed, respectively. Further, the Y colored layer with the maximum luminance and the B colored layer with the fourth highest luminance are arranged in one half of the pixel region, and in the other half, the G colored layer with the second highest luminance and the R colored layer with the third highest luminance are arranged, and therefore the luminance ratio of the one half to the other half in the pixel region can be close to 1. Accordingly, color separation of a straight white line displayed with a mixed color of RGBY on a black background can be reduced.

The direction were the above-mentioned stripe-shaped R, G, Y, and B colored layers are arranged in this order inside the pixel region may be the left direction in FIG. 8, and also in such a preferred embodiment, the same operation-effect can be exhibited. The direction of the color array of the above-mentioned R, G, B, and Y colored layers may be the same inside all of the pixel regions, and may be different among the pixel regions.

Another preferred embodiment of the present invention provides a display device including the above-mentioned color filter substrate. According to this, a straight white line can be displayed with a mixed color on a black background without color separation. A liquid crystal display device is preferable as the above-mentioned display device. Preferable examples of the above-mentioned liquid crystal display device include a liquid crystal display device including a liquid crystal layer interposed between the above-mentioned color filter substrate and a thin film transistor array substrate. The above-mentioned liquid crystal display device may be a transmissive liquid crystal display device, a transflective liquid crystal display device, or a reflective liquid crystal display device.

The color filter substrate according to a preferred embodiment of the present invention can reduce color separation of a straight line displayed with a mixed color and particularly color separation of a straight white line displayed with a mixed color on a black background because at least one pair of colored layers not next to each other when colored layers of all the colors are arrayed in order of hue is adjacently arranged to each other, as mentioned above.

Other features, elements, steps, advantages and characteristics of the present invention will become more apparent from the following detailed description of preferred embodiments thereof with reference to the attached drawings.

BRIEF DESCRIPTION OF DRAWINGS

FIGS. 7A and 7B are a planar view schematically showing one example of the color filter substrate according to a preferred embodiment of the present invention.

FIG. 8 is a planar view schematically showing a pixel configuration of the color filter substrate according to a third preferred embodiment of the present invention.

FIG. 9 is a planar view schematically showing one example of the pixel configuration of the color filter substrate according to a preferred embodiment of the present invention.

FIG. 16 is a planar view schematically showing a pixel configuration of the color filter substrate according to a tenth preferred embodiment of the present invention.

FIG. 17 is a planar view schematically showing a pixel configuration of the color filter substrate according to a second comparative embodiment.

FIG. 18 is a planar view schematically showing a pixel configuration of a conventional color filter substrate.

DETAILED DESCRIPTION OF THE PREFERRED EMBODIMENTS

The present invention is described below in more detail with reference to preferred embodiments, but it is not limited to only these preferred embodiments. A layer of achromatic color is not included as the colored layer in the present invention.

First Preferred Embodiment

Figure 1:
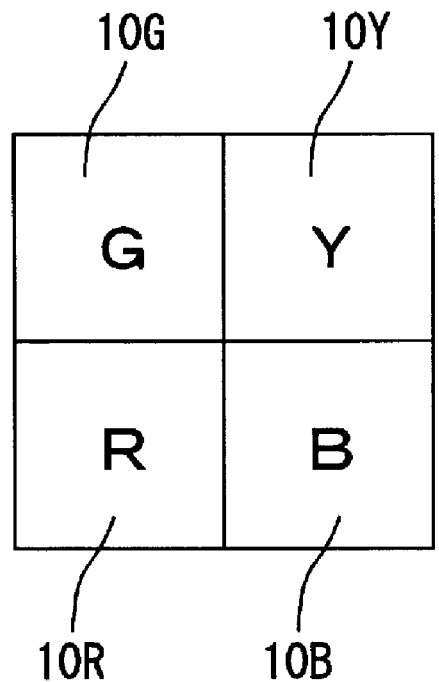
FIG. 1 is a planar view schematically showing a pixel configuration of the color filter substrate according to a first preferred embodiment of the present invention.
Figure 2:
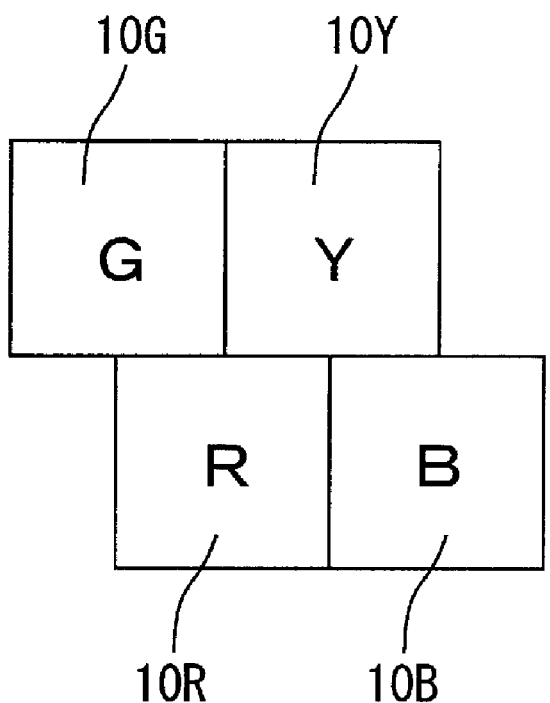
FIG. 2 is a planar view schematically showing one example of a pixel configuration of the color filter substrate according to a preferred embodiment of the present invention.
Figure 3:
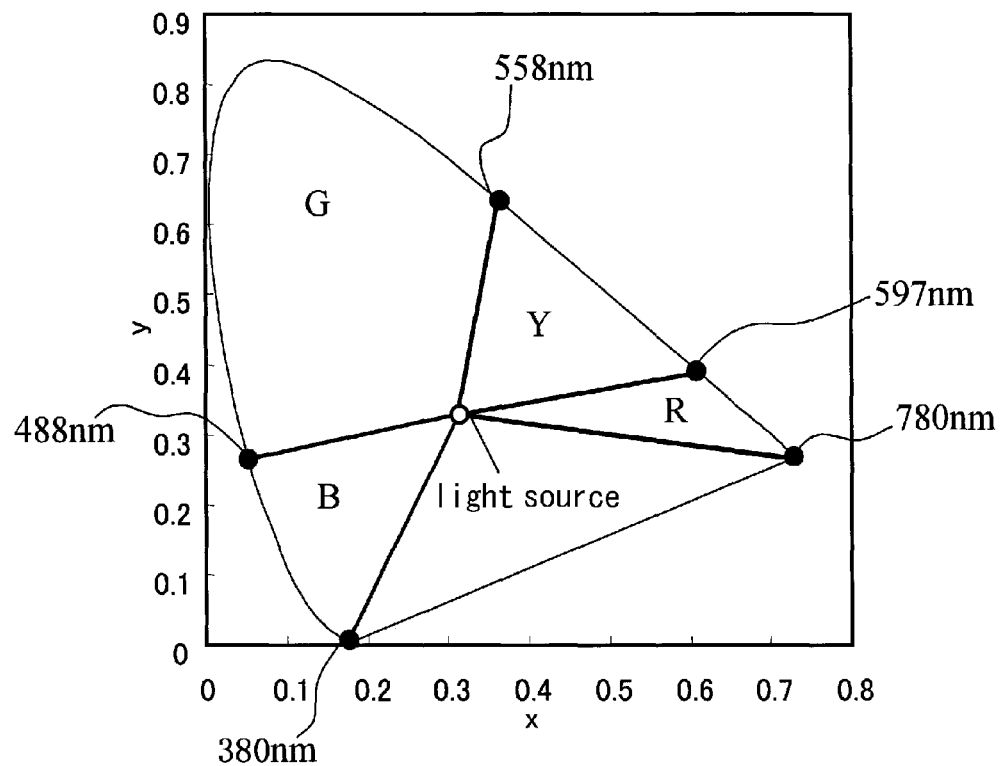
FIG. 3 is a CIE 1931 xy chromaticity diagram showing color definition.

FIG. 1 is a planar view schematically showing a pixel configuration of a color filter substrate according to a first preferred embodiment of the present invention. According to the color filter substrate of the present preferred embodiment, a red colored layer 10R, a green colored layer 10G, a yellow colored layer 10Y, and a blue colored layer 10B are arrayed inside each pixel in a matrix pattern. The color array of these colored layers is in order of red (R), green (G), yellow (Y), blue (B) in the clockwise direction and is not the same as the order of hue (R, Y, G, B).

With the red colored layer 10R, the green colored layer 10G, the yellow colored layer 10Y, and the blue colored layer 10B, dominant wavelengths of the transmission spectrums are 607 nm, 573 nm, 550 nm, and 466 nm, respectively. Further, with respect to a luminance ratio, a ratio of (red colored layer 10R):(green colored layer 10G): (yellow colored layer 10Y): (blue colored layer 10B)=5:10 to 16:2.

Second Preferred Embodiment

Figure 4:
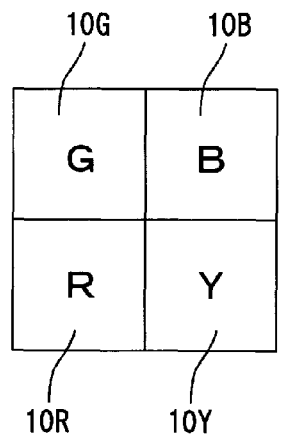
FIG. 4 is a planar view schematically showing a pixel configuration of the color filter substrate according to a second preferred embodiment of the present invention.

FIG. 4 is a planar view schematically showing a pixel configuration of a color filter according to a second preferred embodiment. According to the color filter in the second preferred embodiment, the color array of the colored layers is in order of R, G, B, Y in the clockwise direction, which is different from that in the first preferred embodiment. However, the color filter substrate is the same as that in the first preferred embodiment in that the color array of the colored layers is not the same as the order of hue and that the red colored layer 10R and the green colored layer 10 G which are opponent colors, the yellow colored layer 10Y and the blue colored layer 10B which are opponent colors, are adjacently arranged to each other, respectively.

First Comparative Embodiment

Figure 5:
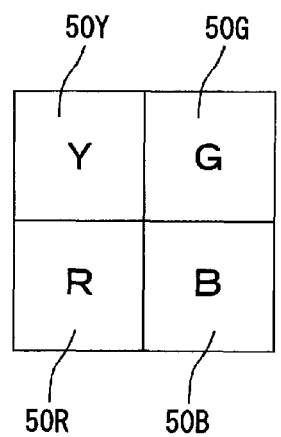
FIG. 5 is a planar view schematically showing a pixel configuration of the color filter substrate according to a first comparative embodiment.

FIG. 5 is a planar view schematically showing a pixel configuration of a color filter substrate according to the first comparative embodiment.

According to the color filter in the first comparative embodiment, the color array of the colored layers is in order of R, Y, G, B in the clockwise direction. The color filter substrate is the same as in the first preferred embodiment, except that the color array is the same as the order of hue. Optical characteristics of a red colored layer 50R, a green colored layer 50G, a yellow colored layer 50Y, and a blue colored layer 50B are the same as those of the red colored layer 10R, the green colored layer 10G, the yellow colored layer 10Y, and the blue colored layer 10B, respectively.

Comparison of First and Second Preferred Embodiments with First Comparative Embodiment In the first comparative embodiment, the red colored layer 50R and the green colored layer 50G which are opponent colors, and the yellow colored layer 50Y and the blue colored layer 50B which are opponent colors, are diagonally arranged to each other, respectively, as shown in FIG. 5. Therefore, a R light and a G light, and a Y light and a B light, are insufficiently mixed. With the respect to the luminance ratio in the column direction, (a total luminance in the column where Y and R are arranged):(a total luminance in the column where G and B are arranged)=21:12, which is far from 1:1. Therefore, a white longitudinal line is observed to be separated into a yellow orange color and a blue color when displayed with a mixed color of RGBY on a black background.

In contrast, in the first and second preferred embodiments, the red colored layer 10R and the green colored layer 10G which are opponent colors, and the yellow colored layer 10Y and the blue colored layer 10B which are opponent colors, are adjacently arranged to each other in the column direction, respectively, as shown in FIGS. 1 and 4. Therefore, a R light and a G light, and a Y light and a B light, can be sufficiently mixed, respectively. With the respect to the luminance ratio in the column direction, (a total luminance in the column where G and R are arranged):(a total luminance in the column where Y and B are arranged)=15:18, which is closer to 1:1, in comparison to the first comparative embodiment. Accordingly, in the first and second preferred embodiments, color separation of a longitudinal straight white line displayed with a mixed color of RGBY on a black background can be sufficiently reduced.

Figure 6A:
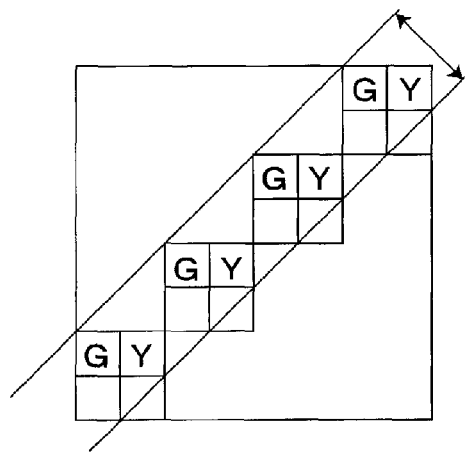
FIGS. 6A and 6B are planar views schematically showing a state where a straight line is displayed in an oblique direction using the color filter substrate according to the first preferred embodiment of the present invention.
Figure 6B:
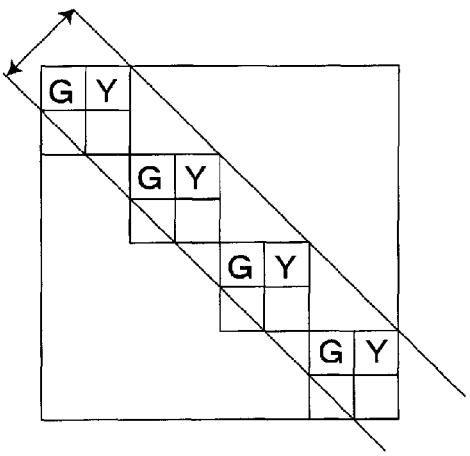

In addition, in the first preferred embodiment, the yellow colored layer 10Y with the maximum luminance and the colored layer 10G with the second highest luminance are adjacently arranged to each other in the row direction. Therefore, as shown in FIGS. 6A and 6B, a line width in the right oblique direction and that in the left oblique direction can be the same when a straight white line is displayed with a mixed color of RGBY on a black background in oblique directions.

In the first and second preferred embodiments and the first comparative embodiment, the color array of the colored layers is considered only in terms of the clockwise direction, but in terms of the counterclockwise direction, the operation and effects are the same. The color filter substrate according to the first preferred embodiment has a configuration shown in FIG. 7A, but the same operation and effects can be exhibited even if the color filter substrate has a configuration shown in FIG. 7B.

Third Preferred Embodiment

FIG. 8 is a planar view schematically showing a color filter substrate according to the third preferred embodiment of the present invention. According to the color filter substrate in the present preferred embodiment, the red colored layer 10R, the green colored layer 10G, the yellow colored layer 10Y, and the blue colored layer 10B are arrayed inside every pixel in a stripe pattern. The color array of these colored layers is in order of red (R), green (G), yellow (Y), blue (B) in the right direction in FIG. 8, which is not the same as the order of hue (R, B, G, Y).

The dominant wavelengths of the transmission spectrums and the luminance ratios of the colored layers having respective colors are the same as those in the first preferred embodiment.

Fourth Through Sixth Preferred Embodiments

Figure 10:
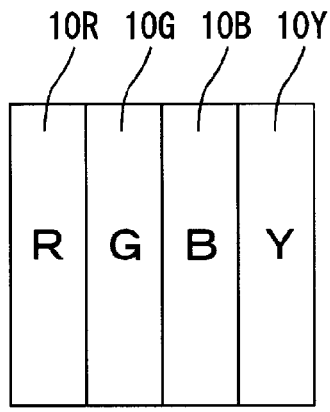
FIG. 10 is a planar view schematically showing a pixel configuration of the color filter substrate according to a fourth preferred embodiment of the present invention.
Figure 11:
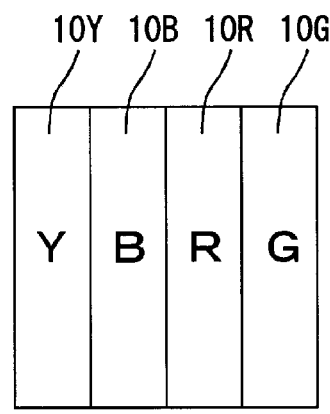
FIG. 11 is a planar view schematically showing a pixel configuration of the color filter substrate according to a fifth preferred embodiment of the present invention.
Figure 12:
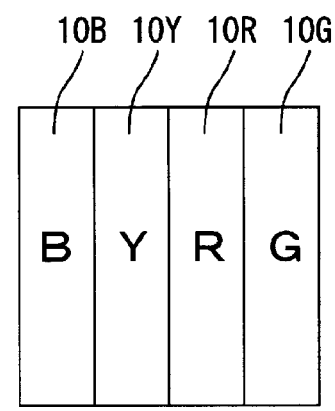
FIG. 12 is a planar view schematically showing a pixel configuration of the color filter substrate according to a sixth preferred embodiment of the present invention.

FIGS. 10 to 12 are planar views schematically showing pixel configurations of color filter substrates according to the fourth through Sixth preferred embodiments of the present invention, respectively.

In the color filter substrates according to the fourth through sixth preferred embodiments, the color array of the colored layers is different from that in the third preferred embodiment. However, the color filter substrates are the same as that in third preferred embodiment in that the color array of the colored layers is not the same as the order of hue and that the red colored layer 10R and the green colored layer 10 G which are opponent colors, the yellow colored layer 10Y and the blue colored layer 10B which are opponent colors, are adjacently arranged to each other, respectively.

Seventh and Eighth Preferred Embodiments

Figure 13:
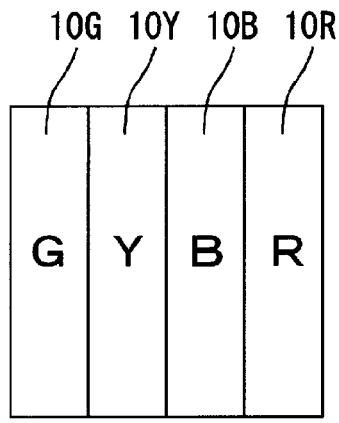
FIG. 13 is a planar view schematically showing a pixel configuration of the color filter substrate according to a seventh preferred embodiment of the present invention.
Figure 14:
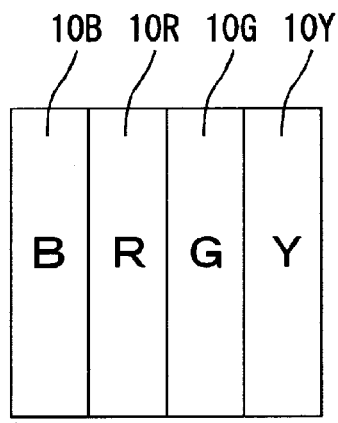
FIG. 14 is a planar view schematically showing a pixel configuration of the color filter substrate according to an eighth preferred embodiment of the present invention.

FIGS. 13 and 14 are planar views schematically showing pixel configurations of color filter substrates according to the seventh and eighth preferred embodiments of the present invention, respectively.

In the color filter substrate according to the seventh preferred embodiment, the color array of the colored layers is different from that in the third preferred embodiment, as shown in FIG. 13. However, the color filter substrate is the same as that in the third preferred embodiment in that the color array of the colored layers is not the same as the order of hue and that the yellow colored layer 10Y and the blue colored layer 10B which are opponent colors are arranged next to each other and that the yellow colored layer 10Y with the maximum luminance and the green colored layer 10G with the second highest luminance are arranged next to each other.

Also in the color filter substrate according to eighth preferred embodiment, the color array of the colored layers is different from that in the third preferred embodiment, as shown in FIG. 14. However, the color filter substrate is the same as in the third preferred embodiment in that the color array of the colored layers is not the same as the order of hue and that the red colored layer 10R and the green colored layer 10G which are opponent colors are arranged next to each other and that the yellow colored layer 10Y with the maximum luminance and the green colored layer 10G with the second highest luminance are adjacently arranged to each other.

Ninth and Tenth Preferred Embodiments

Figure 15:
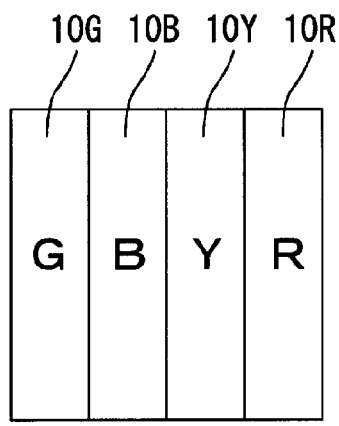
FIG. 15 is a planar view schematically showing a pixel configuration of the color filter substrate according to a ninth preferred embodiment of the present invention.

FIGS. 15 and 16 are planar views schematically showing pixel configurations of color filter substrates according to the ninth and tenth preferred embodiments of the present invention, respectively.

In the color filter substrate according to the ninth preferred embodiment, the color array of the colored layers is different from that in the third preferred embodiment, as shown in FIG. 15. However, the color filter substrate is the same as in the third preferred embodiment in that the color array of the colored layers is not the same as the order of hue and that the yellow colored layer 10Y and the blue colored layer 10B which are opponent colors are adjacently arranged to each other.

In the color filter substrate according to the tenth preferred embodiment, the color array of the colored layers is different from that in the third preferred embodiment, as shown in FIG. 16. However, the color filter substrate is the same as in the third preferred embodiment in that the color array of the colored layers is not the same as the order of hue and that the red colored layer 10R and the green colored layer 10G which are opponent colors are adjacently arranged to each other.

Second Comparative Embodiment

FIG. 17 is a planar view schematically showing a pixel configuration of a color filter substrate according to the second comparative embodiment.

The color filter substrate according to the second comparative embodiment is the same as that in the third preferred embodiment except that the red colored layer 50R, the green colored layer 50G, the yellow colored layer 50Y, and the blue colored layer 50B are arranged in a stripe pattern in order of R, Y, G, B in the right direction in FIG. 17, and the color array is the same as the order of hue.

Comparison of Third Through Tenth Preferred Embodiments with Second Comparative Embodiment According to the second comparative embodiment, the red colored layer 50R and the green colored layer 50G which are opponent colors, and the yellow colored layer 50Y and the blue colored layer 50B which are opponent colors, are arranged to be spaced to each other, as shown in FIG. 17. Therefore, a R light and a G light, and a Y light and a B light, are insufficiently mixed. As a result, color separation of a longitudinal straight white line is generated when the line is displayed with a mixed color of RGBY on a black background.

In contrast, in the Seventh to Tenth Preferred Embodiments, either of the pair of the red colored layer 10R and the green colored layer 10G which are opponent colors or the pair of the yellow colored layer 10Y and the blue colored layer 10B which are opponent colors are adjacently arranged to each other, respectively, as shown in FIGS. 13 to 16. In addition, in the third through sixth preferred embodiments, both of the pair of the red colored layer 10R and the green colored layer 10G which are opponent colors, and the pair of the yellow colored layer 10Y and the blue colored layer 10B which are opponent colors are adjacently arranged to each other in the column direction, respectively, as shown in FIGS. 8 and 10 to 12. Therefore, in the seventh through tenth preferred embodiments, color separation of a longitudinal straight white line displayed with a mixed color of RGBY on a black background can be reduced, and further reduced in the third through sixth preferred embodiments.

In the third, seventh and eighth preferred embodiments, the yellow colored layer 10Y with the maximum luminance and the green colored layer 10G with the second highest luminance are adjacently arranged to each other, as shown in FIGS. 8, 13, and 14. Therefore, color separation of a straight line, attributed to the arrangement in which these colored layers are separately arranged to each other, can be prevented. In addition, in the third preferred embodiment, the yellow colored layer 10Y with the maximum luminance and the green colored layer G with the second highest luminance are adjacently arranged to each other at the center part of the pixel region, as shown in FIG. 8. Therefore, the above-mentioned color separation of the straight line can be further reduced.

In the third through sixth preferred embodiments, a luminance ratio of the right half to the left half of the pixel region is 18:15 or 15:18, which is closer to 1:1, in comparison to the second comparative embodiment. Therefore, in the third through sixth preferred embodiments, color separation of a straight line, attributed to that the luminance ratio of the right half to the left half in the pixel region is far from 1:1, can be reduced.

In the third through tenth preferred embodiments and the second comparative embodiment, the color array of the colored layers is considered only in terms of the right direction, but in terms of the left direction, the operation and effects are the same.

Eleventh Preferred Embodiment

One liquid crystal display device including the color array of the colored layers according to a preferred embodiment of the present invention is exemplified below.

The liquid crystal display device according to the present preferred embodiment (the present display device) is a transflective liquid crystal display device.

That is, according to the present display device, an observer observes mainly transmitted display light using light from a backlight under relatively dark illumination such as indoor illumination (transmission mode). The observer observes mainly reflected display light using surrounding light under relatively bright illumination such as outdoor illumination (reflection mode).

The configuration of the present display device is described first.

Figure 19:
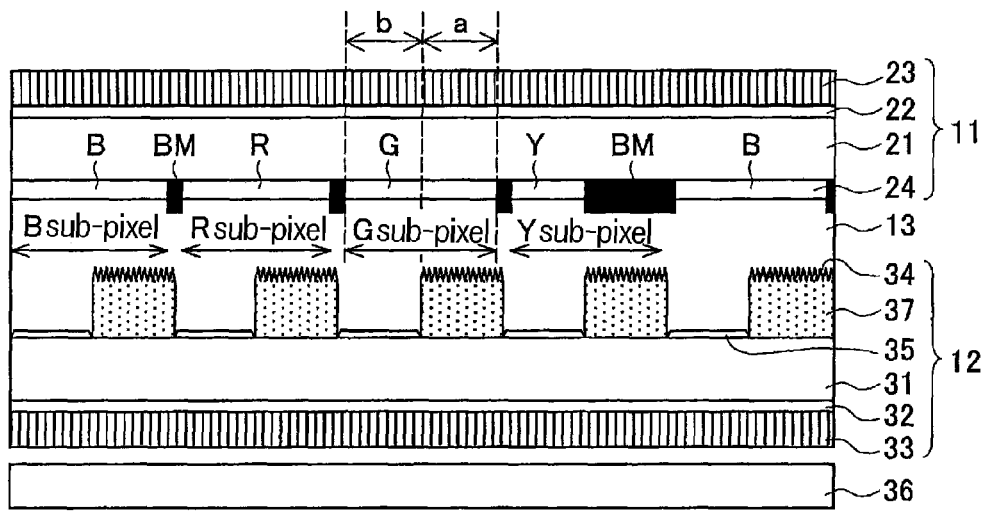
FIG. 19 is an explanation view showing a configuration of a liquid crystal display device according to a preferred embodiment of the present invention.

FIG. 19 is a cross-sectional view schematically showing a configuration of the present display device.

As shown in FIG. 19, the present display device has a configuration in which a liquid crystal layer 13 is interposed between a counter substrate 11 and a pixel substrate 12.

According to the present display device, one sub-pixel region is a region formed by combination of a reflective region a and a transmissive region b in FIG. 19.

The reflective region a is a sub-pixel region used for reflective display (reflective display region), and the transmissive region b is a sub-pixel region used for transmissive display (transmissive display region).

The respective sub-pixels are classified into four different (four color) sub-pixels (red (R) sub-pixel, blue (B) sub-pixel, green (G) sub-pixel, and yellow (Y) sub-pixel) corresponding to four different colored layers (R to Y colored layers) in a color filter 24 mentioned below.

As shown in FIG. 19, the counter substrate 11 has a configuration in which a retarder 22 and a polarizer 23 are provided on the outer side of the glass substrate 21 and on the inner side of the glass substrate 21, the color filter 24 is provided.

The retarder 22 adjusts polarization state of light transmitted therethrough.

The polarizer 23 transmits only light having a specific polarization component.

The color filter 24 selects color of light transmitted therethrough and includes four colored layers of a red (R) colored layer, a blue (B) colored layer, a green (G) colored layer, and a yellow (Y) colored layer. The R to Y colored layers mainly transmit a red component, a blue component, a green component, a yellow component (red and green components) of incident light, respectively.

The R to Y colored layers are arranged one each inside the R to Y sub-pixels each including the above-mentioned reflective region a and the transmissive region b. The B colored layer, the R colored layer, the G colored layer, and the Y colored layer are arranged in this order. Accordingly, according to the display device shown in FIG. 19, both of the pair of the R colored layer and the G colored layer, and the pair of the Y colored layer and the B colored layer, are adjacently arranged to each other, respectively. As a result, color lights transmitted through the above-mentioned pairs of the colored layers can be sufficiently mixed, and therefore color separation of a straight white line displayed with a mixed color on a black background can be reduced.

The reflective region a and the transmissive region b have each of the R to Y colored layers with almost the same size and film thickness. The size and the film thickness are not necessarily the same. The luminance of each color is changed by changing the size or the film thickness of the colored layers, and therefore it is preferable that the colored layers of respective colors are designed in such a way that white balance is maintained.

Further, a black matrix BM is formed at a portion between the sub-pixels in the color filter 24.

Particularly, the present display device is designed in such a way that the BM is applied in the reflective region a of the Y sub-pixel and thereby this reflective region a is light-shaded.

The pixel substrate 12 has a configuration in which a retarder 32 and a polarizer 33 are included on the outer side of a glass substrate 31 and on the inner side of the glass substrate 31, a projection 37, a reflective electrode 34 and a transparent electrode 35 are included.

The retarder 32 adjusts polarization state of light transmitted therethrough, as the retarder 22.

The polarizer 33 transmits only light having a specific polarization component, as the polarizer 23.

A backlight (external light source) 36 is disposed on the back of the pixel substrate 12 (on the side opposite to the liquid crystal layer 13). The backlight 36 is an LED used for the transmissive display. The reflective electrode (reflective member) 34 is an electrode having a function of reflecting light, and is made of a metal such as Al. The transparent electrode 35 is an electrode made of a transparent conductive material such as ITO.

The projection 37 is disposed as a lower layer of the reflective electrode 34 in the reflective region a and is a base on which the reflective electrode 34 is formed.

According to the present display device, this projection 37 generates a difference in thickness (cell thickness) between the liquid crystal layer 13 corresponding to the reflective region a and the liquid crystal layer 13 corresponding to the transmissive region b.

Then, a color reproduction range (filter color reproduction range) of the color filter 24 is mentioned.

A color of light emitted from the color filter 24 is expressed by additive color mixture including four primary colors of RGBY in the transmission mode, or by additive color mixture including three colors of RGB in the reflection mode.

If chromatic coordinates of these four primary colors (or three primary colors) are plotted on an xy chromaticity diagram (an XYZ calorimetric system chromaticity diagram according to CIE), the inside of the expressed quadrangle (or the inside of the expressed triangle) is the filter color reproduction range. The filter color reproduction range depends on an area of the above-mentioned quadrangle (or triangle).

Accordingly, the color reproduction range of the color filter 24 depends on strength of the color obtained through the color filter 24.

That is, if the filter color reproduction range is narrow, only faint colors are obtained through the color filter.

If the filter color reproduction range is wide, dark colors can be expressed through the color filter (the display color can be diversified). The wider the filter color reproduction range is, the more the amount of light transmitted through the color filter is limited (the light amount is decreased).

In addition, the present display device performs display using the four primary colors in the transmission mode, and therefore the filter color reproduction range can be extended in comparison to the case where the display is performed using the three primary colors.

In the present display device, display light from the reflective region a (reflective display light) passes through the color filter 24 twice, and display light from the transmissive region b (transmissive display light) passes through the color filter 24 only one time.

Therefore, the filter color reproduction range of the reflective region a (reflective filter range) is obtained by causing light to transmit through the color filter twice. In contrast, the filter color reproduction range of the transmissive region (transmissive filter range) is obtained by causing light to enter the color filter only one time.

As mentioned above, according to the present display device, the color number of the used colored layers in the color filter 24 and the number of passage of light through the color filter 24 are different between the transmissive region b and the reflective region a. Accordingly, it is preferable that the transmissive filter range is made equal to the reflective filter range as much as possible by some methods (color adjustment between both the modes). As a result, the color reproduction ranges of lights obtained through the color filter 24 can be uniform between the reflection mode and the transmission mode. Such color adjustment can be performed by forming the color filter 24 to have different thicknesses between the reflective region a and the transmissive region b.

A λ/4 retarder is used as the retarders 22 and 32 in the present display device. The arrangement and the configuration of the polarizers 23 and 33 and the retarders 22 and 32 are adjusted in such a way that the polarizer 22 and the retarder 23 function together as one circular polarizer (front polarizer) and that the polarizer 33 and the retarder 32 function together as another circular polarizer (rear polarizer).

Further, the above-mentioned front polarizer (on the counter substrate 11 side) and rear polarizer (on the pixel substrate 12 side) are disposed to be optically perpendicular to each other.

Therefore, liquid crystal molecules of liquid crystal materials of the liquid crystal layer 13 vertically align to the substrates 11 and 12 when no voltage is applied to the electrodes. In this case, the liquid crystal layer 13 does not transmit light externally, and therefore the present display device performs black display.

In the configuration in FIG. 19, the BM is formed in the reflective region a inside the Y sub-pixel, thereby this region is light-shaded in order to perform display of three colors in the reflective mode. Alternatively, this region may be light-shaded by applying another light-shading material to the reflective region a of the Y sub-pixel.

Further, the reflective region a is not formed in the Y sub-pixel and the Y sub-pixel may be formed only by the transmissive region b.

Figure 20:
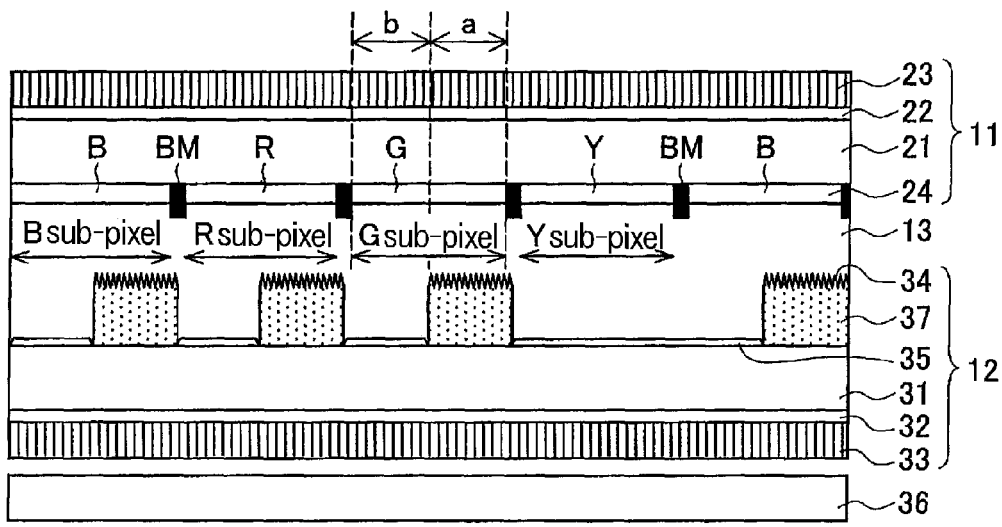
FIG. 20 is an explanation view showing a configuration of a liquid crystal display device according to another preferred embodiment of the present invention.

For example, the present display device may have a configuration shown in FIG. 20. In this configuration, the Y sub-pixel is designed to have only the transmissive region b in the region having the same size as inside other RGB pixels. Accordingly, the transmissive region b of the Y sub-pixel is larger than that of other RGB sub-pixels by the reflective region a.

In this case, the part light-shaded by the BM can be narrow, and therefore use efficiency of light can be improved.

In this configuration, the projection 37 shown in FIG. 19 is formed inside the transmissive region b of the Y sub-pixel and on this projection 37, the transparent electrode 35 may be formed. This configuration can be easily realized by forming the transparent electrode 35 instead of the reflective electrode 34 in the configuration shown in FIG. 19.

However, in a configuration in which no projections 37 are formed, light is not absorbed at the projection 37 made of a resin, and therefore the use efficiency of light can be improved.

In a configuration in which the Y sub-pixel is formed only by the transmissive region b as shown in FIG. 20, the liquid crystal layer 13 is driven to perform display using three sub-pixels of RGB in the reflection mode and using four sub-pixels of RGBY in the transmission mode.

Figure 21:
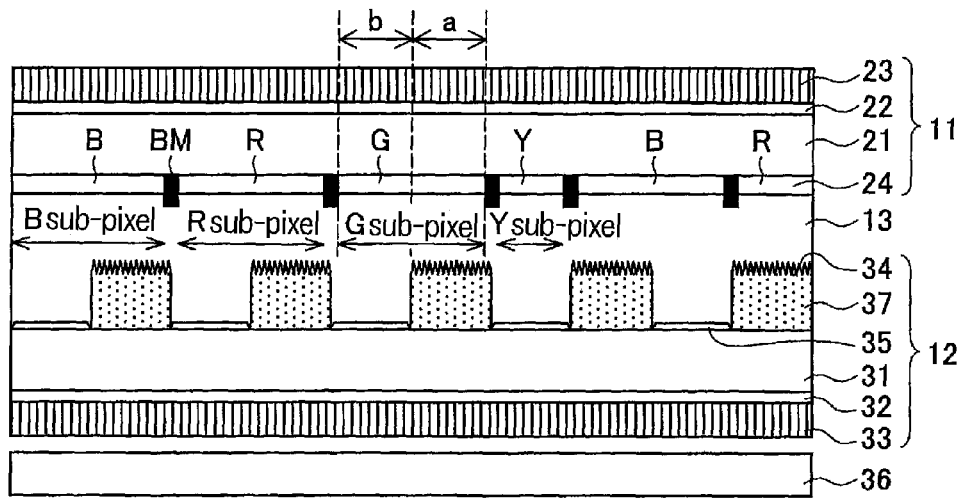
FIG. 21 is an explanation view showing a configuration of a liquid crystal display device according to another preferred embodiment of the present invention.

If the Y sub-pixel is formed only by the transmissive region, it may be possible that the transmissive region b of the Y sub-pixel is formed to have the same size as the transmissive region b of other RGB sub-pixels, as shown in FIG. 21. In this case, the Y sub-pixel is smaller than the other RGB sub-pixels by the reflective region a.

In the present preferred embodiment, the color filter 24 is a color filter constituted by four colors of RGBY. Alternatively, the color filter 24 of the present display device may be a five-color color filter including a C (cyan) colored layer which mainly transmits a cyan component of incident light in addition to the colored layers of R, G, B, and Y.

Figure 22:
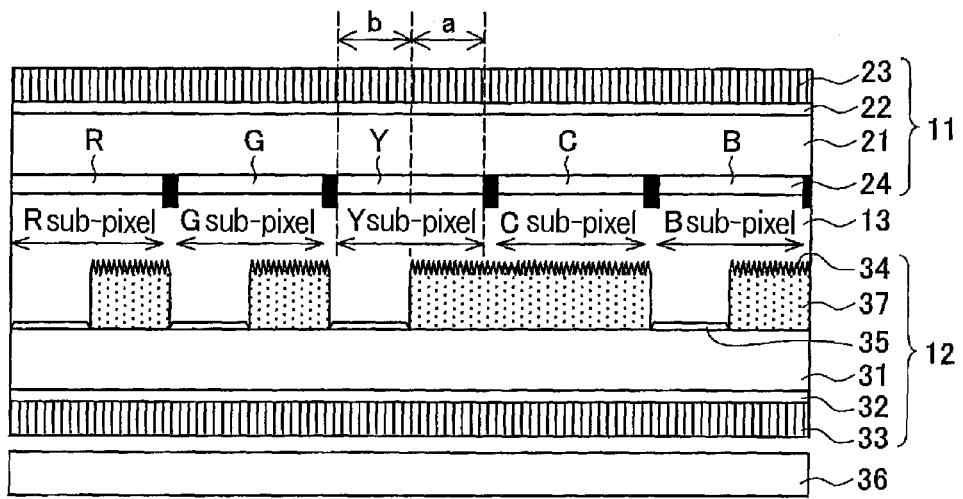
FIG. 22 is an explanation view showing a configuration of a liquid crystal display device according to another preferred embodiment of the present invention.

FIG. 22 is an explanation view showing a configuration of the present display device, including the color filter 24 having colored layers of R, G, B, Y, and C.

In this configuration, the sub-pixels of the present display device are classified into five different (five color) sub-pixels (red (R) sub-pixel, blue (B) sub-pixel, green (G) sub-pixel, yellow (Y) sub-pixel, and cyan (C) sub-pixel) corresponding to five different colored layers in the color filter 24.

In this configuration, the R colored layer, the G colored layer, the Y colored layer, the C colored layer, and the B colored layers are successively arranged. Accordingly, in the display device shown in FIG. 22, the pair of the R colored layer and the G colored layer, and the pair of the Y colored layer and the C colored layer, are adjacently arranged to each other, respectively. As a result, color lights transmitted through the above-mentioned pairs of the colored layers can be sufficiently mixed, and therefore color separation of a straight white line displayed with a mixed color on a black background can be reduced.

In addition, in this configuration, the reflective region a and the transmissive region bare formed in each of the RGBY sub-pixels, and the BM covering the reflective region a of the Y sub-pixel, which is shown in FIG. 19, is not formed. In the C sub-pixel, only the reflective region a is formed (that is, the reflective electrode 34 is formed on the entire surface of the color filter 24, in the C sub-pixel) The sub-pixels are configured to have the same size.

Accordingly, in this configuration, an image is displayed using four colored layers (colored layers of R, G, B, and Y) in the transmission mode, and using five colored layers (colored layers of R, G, B, Y, and C) in the reflective mode.

In this configuration, the C colored layer which transmits a large amount of a blue component that is a complementary color of yellow is used, and thereby white balance in the reflection mode is suppressed from being shifted towards yellow. Because of this, improvement in luminance at the time of reflection also can be expected.

In the reflection mode, the luminance and the color reproduction range in this mode can be improved because the five-color display is performed using the Y sub-pixel and the C sub-pixel.

According to the present preferred embodiment, the R to Y colored layers (and the C colored layer) in the color filter 24 are formed to have almost the same thicknesses. Alternatively, the transmissive filter range can be extended by increasing the film thickness of the Y colored layer or changing the ratio among the sub-pixels of RGBY (sub-pixels of RGBYC).

According to the present preferred embodiment, the backlight 36 is constituted by an LED. Alternatively, the backlight 36 may be constituted by a CCFT (cold cathode fluorescent tube) or a HCFT (hot cathode fluorescent tube).

If the pixel is formed by RGBY, the luminance of each color is lower than that of an image constituted by three colors of RGB. Therefore, it is preferable that the luminance and the chromaticity are increased by also lighting Y, when RG are lighted. The luminance of RG display based on the same input is different between display using a pixel with the three primary colors and display using a pixel with four primary colors, and it is preferable to adjust the luminance by lighting Y.

According to the present preferred embodiment, the present display device is a liquid crystal display device. Alternatively, the present display device may be configured as a display device in another system. That is, the present display device can be applied to display devices in any systems as long as it is a display device in which display is performed using a multi-color color filter in both of the reflection mode and the transmission mode.

The configuration of the present display device can be applied, for example, to an organic EL display called a light-emitting display when the display is a hybrid display using liquid crystal display and organic EL display, which performs display using colored layers different between in a transmissive part and in a reflective part.

This Non-Provisional application claims priority (under 35 U.S.C. §119) on Patent Application No. 2005-109226 filed in Japan on Apr. 5, 2005 and Patent Application No. 2005-295779 filed in Japan on Oct. 7, 2005, the entire contents of which are hereby incorporated by reference.

The terms "or more" and "or less" in the present description mean that the value described is included. That is, the term "or more" means the described value and values more than the described value.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
a backlight; and
a color filter substrate arranged to receive light from the backlight, the color filter substrate including colored layers of at least four colors, arrayed in a row inside of a pixel region; wherein
the at least four colors include red, green, blue, and yellow;
specific physical properties of the yellow colored layer, the red colored layer, the green colored layer, and the blue colored layer are selected such that when light emitted from the backlight passes through the color filter substrate, the yellow color will have the highest luminance out of all of the at least four colors;
the colors arranged in the row are arranged such that the yellow color is adjacent to the red color, the red color is adjacent to the green color, and the green color is adjacent to the blue color; and
the green color has the second highest luminance out of all of the at least four colors.

2. The display device according to claim 1, wherein the luminance ratio between the right half of the pixel region and the left half of the pixel region is between 18:15 and 15:18.

3. The display device according to claim 1, wherein the colors arranged in the row are arranged such that the red color is adjacent to the green color, the green color is adjacent to the blue color, and the blue color is adjacent to the yellow color.

4. The display device according to claim 3, wherein the luminance ratio between the right half of the pixel region and the left half of the pixel region is between 18:15 and 15:18.

5. The display device according to claim 1, wherein the colors arranged in the row are arranged such that the blue color is adjacent to the yellow color, the yellow color is adjacent to the red color, and the red color is adjacent to the green color.

6. The display device according to claim 5, wherein the luminance ratio between the right half of the pixel region and the left half of the pixel region is between 18:15 and 15:18.

7. The display device according to claim 1, wherein the red color has the third highest luminance out of all of the at least four colors; and the blue color has the fourth highest luminance out of all of the at least four colors.

8. The display device according to claim 1, wherein the specific physical properties correspond to respective thicknesses of the yellow colored layer, the red colored layer, the green colored layer, and the blue colored layer.

9. The display device according to claim 1, wherein the specific physical properties correspond to respective materials of the yellow colored layer, the red colored layer, the green colored layer, and the blue colored layer.

* * * * *